May 20, 1952     H. ST. PIERRE     2,597,762
CROSS CHAIN FOR TIRE CHAINS
Filed Sept. 9, 1950
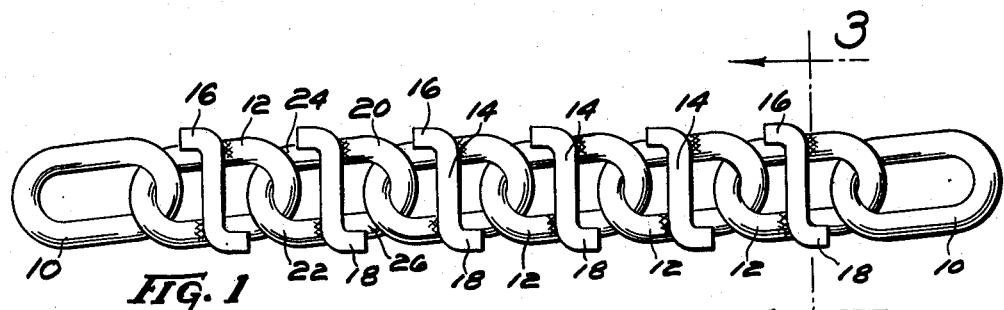
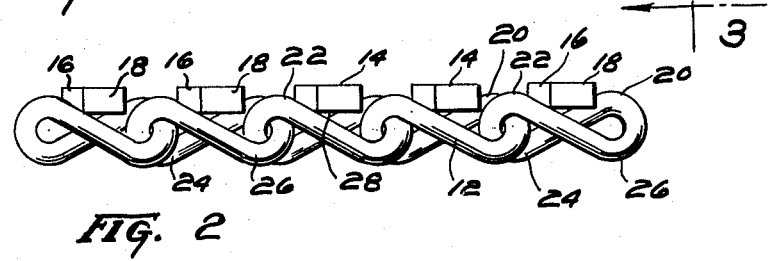
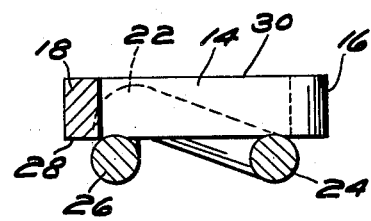
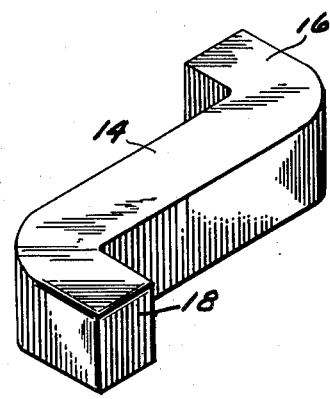
INVENTOR.
HENRY ST. PIERRE
BY
Charles R. Fay,
ATTORNEY Patented May 20, 1952

2,597,762

UNITED STATES PATENT OFFICE 2,597,762

CROSS CHAIN FOR TIRE CHAINS

Henry St. Pierre, Worcester, Mass.

Application September 9, 1950, Serial No. 184,050

1 Claim. (Cl. 152—245)

This invention relates to new and improved cross chain for tire chains and the principal object of the invention resides in the provision of an improved reenforced cross chain which will be much longer lasting than conventional reenforced cross chains as well as having a greater traction grip on slippery surfaces such as snow, ice, mud, sand, etc.

Another object of the invention resides in the provision of a cross chain for tire chain comprising a length of connected chain links, certain of which have secured thereto transversely thereof a reenforcing bar with offset ends, said ends coinciding in general with the side runs of the links but extending therebeyond to a relatively slight but effective degree, said offset ends providing a great deal more traction than would otherwise be the case; the provision of a cross chain as above described wherein the offset ends of the reenforcing bars extend oppositely from each other, more or less in the general direction of the length of the cross chain, the latter comprising twisted links, each of which has at each end thereof opposite high and low points, and said offset ends being directed toward and extending into the areas of the low points thereof whereby said bars do not extend so high above the links as to create an unwanted rough riding of the tire but at the same time comprise substantial amounts of steel to reenforce the links and greatly increase the wear thereof.

Other objects and advantages of the invention will appear hereinafter.

Reference is to be had to the accompanying drawings, in which

Fig. 1 is a top plan view of a length of cross chain according to the present invention;

Fig. 2 is an edge view thereof with the end links omitted;

Fig. 3 is an enlarged section on line 3—3 of Fig. 1; and

Fig. 4 is a perspective view of one of the reenforcing bars.

As shown in the drawings, reference numeral 10 indicates chain links adapted to be secured by the conventional hook or other means to the side chains of a tire chain, these side chains not being shown. Between links 10 there are a series of links 12, each of which is provided with the reenforcing means to be described. As a usual thing, all of the links 10 and 12 will be the same and preferably they are made of twisted chain as is made more apparent in Figs. 2 and 3.

Each of the reenforcing bars generally indicated at 14 comprises preferably a length of rectangular bar stock as shown, although, of course, this shape may be considerably varied without departing from the scope of the invention. Each of the bars 14 is secured transversely of its link substantially midway of the ends thereof and extends in the direction of motion of the vehicle, i. e., parallel to the side chains.

Each of the bars 14 extends transversely beyond the runs of the links 12 and the ends of the bars are offset as shown at 16, 18. These offsets are preferred to lie at right angles to the main portions of the bars 14, but this angle is not critical, and other angles clearly come within the purview of the invention. However, as shown, the offsets 16, 18 extend generally parallel to the length of the cross chain and transversely to the direction of motion of the vehicle, and not only provide elements which greatly enhance the anti-slipping function for which the entire chain was originally designed, but also provides amounts of material in a particular which increases the wear of the cross chains to a considerable degree.

Each of the links 12 includes a pair of high points 20 and 22 with corresponding low points 24, 26, as is the case with conventional twisted chain. Since the bars 14 lie across the links substantially midway thereof, the high points 20 and 22 extend upwardly well above the bottom edges of the bars 14 as at 28, Fig. 2. However, the upper edges of bars 14 as at 30 extend above the highest points of the high link areas 20 and 22 so that the main bulk of each of the bars including the offset ends is well within the limits of the links 12 themselves and thus clearly reenforce the same and add metal thereto without, however, extending far above the links so as to cause rough riding and bumping.

Furthermore, the offset ends point toward the low areas 24 and 26 and extend into said low areas to a considerable degree again providing additional anti-slipping means and wear increasing bulk without extending so as to cause bumping of the chains.

Having thus described my invention and the advantages thereof, I do not wish to be limited to the details herein disclosed, otherwise than as set forth in the claims, but what I claim is:

A cross chain for a tire chain comprising a series of connected twist links having opposite high and low sides at each end and bars secured to certain of the links and extending transversely thereof and of the chain, said bars lying substantially parallel to the direction of motion of the chain when in use, each bar having laterally and oppositely extending offset ends extending into the low sides of the links, said ends each presenting a relatively broad traction device lying parallel to the cross chain and transversely to the said direction of motion of the chain.

HENRY ST. PIERRE.

REFERENCES CITED

The following references are of record in the file of this patent:

UNITED STATES PATENTS

| Number | Name | Date |
|---|---|---|
| 1,684,632 | LaPlant | Sept. 18, 1928 |
| 1,696,255 | Reyburn | Dec. 25, 1928 |
| 1,788,486 | Hall et al. | Jan. 13, 1931 |